March 13, 1956 J. STARNECKI ET AL 2,738,384

RECORDING AND REPRODUCING APPARATUS FOR MAGNETIC-WIRE RECORDS

Filed July 6, 1950

Inventor
Jerzy Starnecki
Frank T. Squires
By
Emery, Holcombe & Blair
Attorney

United States Patent Office 2,738,384

Patented Mar. 13, 1956

2,738,384

RECORDING AND REPRODUCING APPARATUS FOR MAGNETIC-WIRE RECORDS

Jerzy Starnecki and Frank T. Squires, Cambridge, England, assignors to Pye Limited, Cambridge, England, a British company Application July 6, 1950, Serial No. 172,374

Claims priority, application Great Britain July 7, 1949

2 Claims. (Cl. 179—100.2)

The present invention relates to magnetic recording and reproducing devices in which magnetisable wire is used as recording material. It is more particularly concerned with wire recording and reproducing apparatus in which the wire is withdrawn from the inside of a coil contained in a suitable drum or former and, after passing the recording or reproducing head, is rewound similarly inside another former or container, the twist caused by the unwinding from the one coil being utilised to cause the wire to be coiled in the other former or container.

Wire recording and reproducing apparatus of this nature has for example been described in British specification No. 607,818, and accordingly it is one object of the present invention to provide improvements in the apparatus as described in the said British specification. Another object is to provide a wire recording and reproducing apparatus containing improved means for positioning the wire during its passage across the recording or reproducing gap. A further object is to provide an improved wire recording or reproducing apparatus containing a pair of wire-holding containers combined to form a unitary cartridge or magazine which can be readily inserted into and detached from the recording or pick-up head. Yet another object is to provide improved containers in which the coils of a wire recording and reproducing apparatus may be accommodated while being used in the apparatus. Still further objects and various features of the invention will appear more clearly from the following description.

Figure 1:
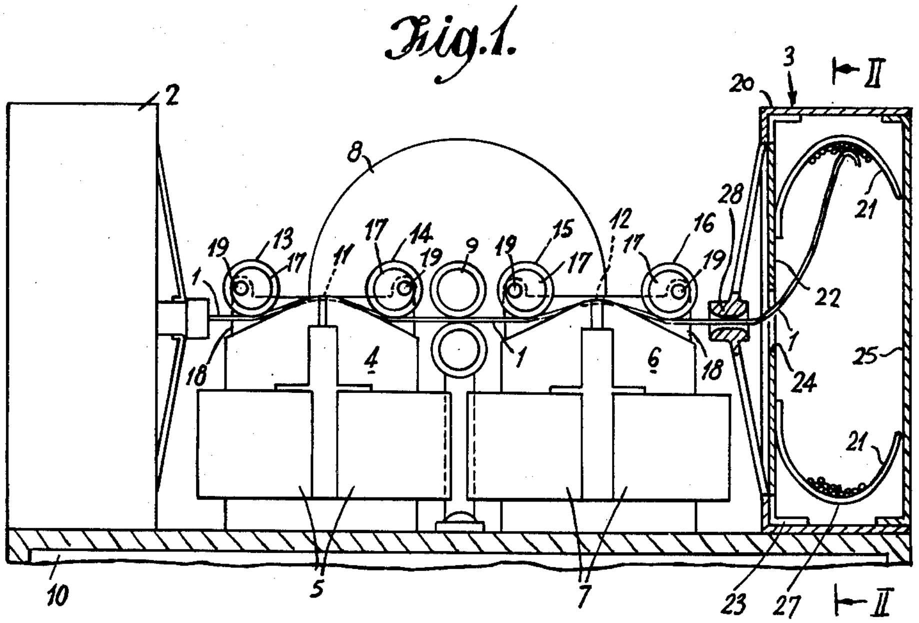
Figure 2:
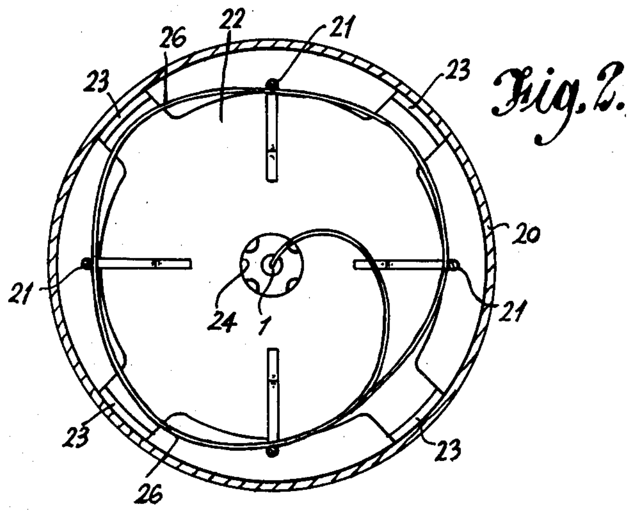

An embodiment of the invention is illustrated in the accompanying drawing in which:

Fig. 1 is a somewhat diagrammatic lateral side elevation partly in section of a recording and reproducing device embodying the invention and, Fig. 2 is a sectional end view on the line II—II of Fig. 1.

Referring now to the drawing, a recording wire 1 extends from a container 2 to a container 3 across an erasing head 4 having a winding 5 and a recording and reproducing head 6 having a winding 7. A driving motor arrangement 8 serves to actuate a pair of driving rollers 9, arranged between the recording and erasing heads 4 and 6 for driving the wire both in the forward direction and for re-winding. A base 10, on which all these parts are mounted, may contain amplifier and other electric circuits usually employed in apparatus of this kind. These electric circuits are well known in the art and do not form part of the present invention and therefore will not be described.

The apparatus is of the type in which uncoiling of the recording wire from one container and the coiling into the take-up container is effected by withdrawing the wire from one container, for example the container 2, and using the inherent twist in the wire for coiling it in the take-up container, the twist imparted to the wire incidental to pulling it out of one container being opposite to the twist required for laying it down in the other container.

An arrangement of this kind is for example described in the above mentioned British specification No. 608,718. In the known arrangement the wire is fed through an aperture in the recording head and, in order that the wire may be fed freely and without kinking, it is necessary that the aperture should be larger than the diameter of the wire. The provision of an aperture of such large diameter, however, gives rise to variations of the contact pressure between the wire and the pole pieces resulting in inefficient and non-uniform recording. In order to prevent this difficulty, the apparatus according to the present invention comprises a recording head of the slotted type and guide rollers or pins positioned on opposite sides of the recording gap in such a manner that the recording wire when fed over the gap and guiding rollers or pins will be flexed to a slight degree and resiliently urged into contact with the pole pieces by the guide rollers or pins. Referring now again more specifically to Fig. 1, the recording head 6 and the erasing head 4, are each provided with a groove or slot 11 or 12 extending across the pole pieces and the magnetic gap of the head, this gap being preferably filled by non-magnetic material in order to provide a smooth guiding surface in the slot. Two guiding rollers 13, 14 are respectively arranged in the path of the wire at the two sides of the erasing head and similarly two guiding rollers 15, 16 are arranged in the path of the wire at the two sides of the recording and reproducing head 6, in such a manner that the path of the wire is slightly flexed by a co-operation of each head with its adjacent pair of rollers. Each roller is rotatable on a shaft 17 which is supported, for example in brackets 18 carried by the erasing and recording heads 4 and 6, by means of eccentric pins 19. Throat plates 19 are arranged between each container 2, 3 and the adjacent roller 13 or 16 respectively to guide the wire into and out of the containers. Preferably the guide rollers or pins are positioned close to the recording or reproducing gap, for example, about ¼" on opposite sides thereof whereby the elementary length of wire which is curved between the two guide rollers or pins is short and consequently there is little tendency for the wire to kink or buckle between the two guide rollers or pins whilst it is being pushed through the head. The eccentric support of the shafts 17 will substantially facilitate the insertion of the wire into the apparatus, since it permits the guide rollers to be raised clear of the path of the wire while the slotted heads permit the wire to be readily placed into position without the necessity of threading it through a small aperture.

While the containers 2 and 3 might be constructed in the manner described in the said earlier British specification, it has been found that in practice with this arrangement the twist produced by the unwinding of a turn in one of the containers is not always such as to produce in the other container turns which neatly apply themselves to the periphery of the container, since the twist imparted to the wire when withdrawing it from or laying it down in the container depends upon the size of the loop, which in turn depends upon the amount of wire already wound in the container. There are also random irregularities in twist which might arise due to the passing of the wire through guides or over rollers, and as a result of these factors the wire fed into the take-up container may space itself from the periphery thereof and form a loose coil or may try to assume a larger diameter than is permitted by the take-up container or the preceding turns of wire already wound therein, with the result that the wire may become tangled. The same factors affect the pulling of the wire out of a container. Loose loops, especially when pulled out, tend to become kinked. It is one of the objects of the present invention to overcome these difficulties and with this object in view means are provided for distorting the circular shape of the loops into which the wire is coiled. In the preferred embodiment as illustrated, this is effected by forming the container with a plurality of fingers extending axially of the coil to be wound and against which the wire is coiled so as to form loops which bulge outwardly between adjacent fingers. Each drum 2 and 3 comprises a cylindrical shell 20 which is fixed to the base 10 of the apparatus. Arranged inside this shell are four resilient fingers 21, constructed for example of spring steel wire, bent to a V or U shape, the base 27 of the V or U being directed outwardly of the container and spaced away from the internal periphery of the shell 20. These fingers are carried by a holder member 22 adapted to be inserted into the shell and formed for example as a circular plate having four bent-over lugs 23, by means of which the holder is adapted to slide into the shell, and a central aperture 24 for the passage of the wire into and out of the container. The open side of the container may be closed by a suitable cover 25 after the holder member 22 has been inserted therein. It will be readily understood that in order to replace a coil of wire by a different one, carrying for example a different record, all that is necessary is to remove the cover 25 thus enabling the holder member 22 with the coil held by the fingers 21 to be pushed outwardly and replaced by another holder carrying a new record, whereafter the cover may be applied again.

As can be seen more clearly from Fig. 2, when a turn of wire of relatively large diameter is introduced into the container, the wire loop formed, after applying itself against the fingers 21 will tend to expand still further and, will at the space between the fingers 21 form bulges 26 which, if necessary, may extend until the bulges touch the internal surface of the shell 20.

With the holder described, the loop of wire fed into the container is always held firmly by the spring steel wire fingers 21. Compensation for the size of the loops is provided due to the spacing between the wire fingers 21 and the shell 20 of the container. The shape of the fingers also tends to group the coils depending upon their natural diameter and prevents obstruction of the hole through which the wire is fed into or out of the container.

A further advantage of the holder according to the invention is that the recording wire is always packed in the holder and does not tend to spring out of the container as soon as the cover is removed. In fact, the holder with the complete coil wound therein can be withdrawn from the container and replaced by another holder with another wire record. This permits the containers to form part of the recording and reproducing apparatus and not a detachable means in which the wire is stored.

The use of a holder according to the invention also avoids the necessity of specially shaping the passage in the throat plates 28 through which the wire is led into the containers. It will, of course, be appreciated that the drawing shows the apertures on an enlarged scale in order to show more clearly the details thereof.

Whilst a particular embodiment of the invention has been illustrated and described, it should be understood that various modifications may be made without departing from the scope of the invention. Thus for example the two containers 2, 3, instead of forming part of the permanent structure of the apparatus may form part of a magazine or cartridge which, apart from the containers also comprises deflecting rollers or pins and which, with the wire already in position, may be clipped or otherwise detachably mounted on the apparatus comprising the recording and erasing heads, thereby inserting the wire into the slots of these heads and causing it to be deflected similarly as described with reference to Fig. 1. The driving rollers may in this case, be arranged to rotate about vertical instead of horizontal axes and to be moved apart for the introduction of the wire, or they may be arranged in the exchangeable cartridge, suitable coupling means being provided for their connection to the driving means of the recording apparatus. Slots or grooves in the pins or rollers may assist or even replace the guiding action of the slots in the pole pieces. In all these embodiments the deflecting rollers may be replaced by suitably curved stationary surfaces such as deflecting pins, more particularly in the case of interchangeable cartridges or magazines in which, while the cartridge is outside the recording apparatus, the wire can be inserted without obstruction by the recording heads without relying upon the eccentric adjustability of the shafts 17. It should also be understood that apart from the apparatus as a whole, the invention also includes all its patentable parts.

We claim:

1. Apparatus for magnetic recording and reproducing of oscillations, comprising a magnetisable core having a pair of magnetic pole pieces separated by a magnetic gap, a coil through which said core passes for mutual electromagnetic induction, means for including said coil in an electric circuit, and means for longitudinally moving a wire of permanently magnetisable material across said magnetic gap, said means including a pair of guide rollers for the wire respectively disposed at opposite sides of said gap and a guiding surface formed by a groove in the magnetic core in the immediate vicinity of the gap, and roller-support members mounted for rotary adjustment in the apparatus, said rollers being rotatably mounted in said support members eccentrically thereof for movement by said rotary adjustment from a normal position in which said guiding surface projects between said pair of rollers for forcing the wire to follow a curved path between said rollers to cause the resilience of the wire to hold said wire against said third surface to a threading position in which said third surface is clear of the common tangent of said guide rollers.

2. Apparatus for magnetic recording and reproducing of oscillations, comprising a magnetisable core having a pair of magnetic pole pieces separated by a magnetic gap, a coil through which said core passes for mutual electromagnetic induction, means for including said coil in an electric circuit, and means for longitudinally moving a wire of permanently magnetisable material across said magnetic gap, said means including a pair of members each formed with a curved guiding surface for the wire, said guide members being respectively disposed at opposite sides of said gap and a further guiding surface being formed by a groove in the magnetic core in the immediate vicinity of the gap, said guide members being mounted for rotary adjustment in the apparatus, about an axis disposed eccentrically relative to the curvature of their respective guiding surface for movement by said rotary adjustment from a normal position in which said further guiding surface projects between the guiding surfaces on said guide members for forcing the wire to follow a curved path between said rollers to cause the resilience of the wire to hold said wire against said third surface to a threading position in which said further surface is clear of the common tangent of the guiding surfaces on said guide members.

References Cited in the file of this patent

UNITED STATES PATENTS

| | | |
|---|---|---|
| 1,758,559 | Croll | May 13, 1930 |
| 2,220,481 | Kritts | Nov. 5, 1940 |
| 2,262,900 | Morgan | Nov. 18, 1941 |
| 2,292,712 | O'Leary | Aug. 11, 1942 |
| 2,428,002 | Barrett | Sept. 30, 1947 |
| 2,457,699 | Maisen | Dec. 28, 1948 |
| 2,476,599 | Haloski | July 19, 1949 |
| 2,493,742 | Begun | Jan. 10, 1950 |
| 2,501,573 | McLouth | Mar. 21, 1950 |
| 2,503,925 | Linkham | Apr. 11, 1950 |
| 2,513,653 | Kornei | July 4, 1950 |
| 2,519,312 | Greenleaf | Aug. 15, 1950 |
| 2,524,064 | Masterson | Oct. 3, 1950 |
| 2,560,234 | Masterson | July 10, 1951 |
| 2,560,430 | Friend | July 10, 1951 |